Dec. 25, 1928.　　　　　　　　　　　　　　　　　1,696,348
W. R. FRAMPTON
ELECTRICAL APPARATUS
Original Filed Aug. 1, 1922
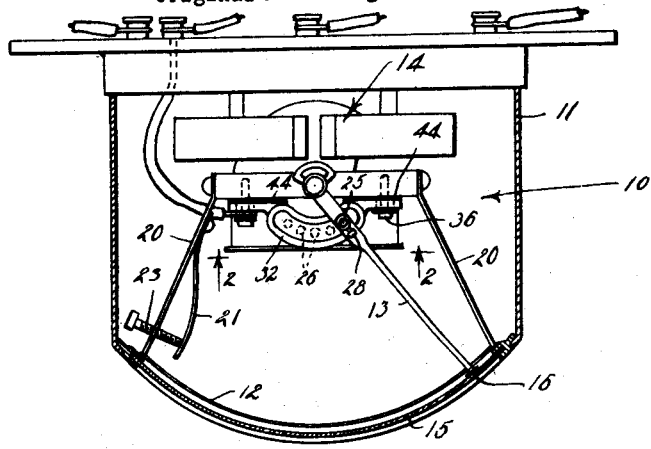
Inventor
William R. Frampton
by
　　his Attorney Patented Dec. 25, 1928.

1,696,348

UNITED STATES PATENT OFFICE.

WILLIAM R. FRAMPTON, OF LOS ANGELES, CALIFORNIA, ASSIGNOR TO SOUTHERN CALIFORNIA EDISON COMPANY, OF LOS ANGELES, CALIFORNIA.

ELECTRICAL APPARATUS.

Original application filed August 1, 1922, Serial No. 579,015. Divided and this application filed June 7, 1924. Serial No. 718,501.

This invention has to do with electrical apparatus, and has particular reference to an instrument such as a gauge, meter, indicator, or the like; involving or including an electrical contact device.

Various instruments, for instance gauges, meters, indicating recording instruments, etc., have, for various reasons, had incorporated or embodied in them, electrical contacts. The contacts ordinarily employed in such instruments are simple wiping contacts in which the cooperating parts are held in cooperative engagement by some form of resilient means. The frictional resistance of such contact devices materially interferes with the operation of the instruments and makes them more or less unreliable and inaccurate; this being particularly true in the case of instruments that are at all delicate.

It is an object of this invention to provide an effective accurate instrument including an electric contact device.

Another object of this invention is to provide a contact device in a delicate instrument, without materially influencing the operation or accuracy of the instrument.

This application is a division of my co-pending application entitled "Ground detector" filed August 1, 1922, Serial No. 579,015.

The objects and features of my present invention will be best and more fully understood from the following detailed description of a typical form and application thereof throughout which description reference is had to the accompanying drawings in which Fig. 1 is a horizontal sectional view of an instrument embodying the present invention.

Fig. 2 is an enlarged detailed sectional view taken as indicated by line 2—2 on Fig. 1.

Fig. 3 is a wiring diagram showing a typical arrangement and application of present invention.

This present invention is applicable to or suitable for embodiment in instruments of various kinds and for various purposes. The invention is not specifically concerned with the manner or means by which the instrument is actuated or the character of the indications or readings of the instrument. For the purpose of facilitating a full and accurate understanding of the invention I have herein disclosed it as applied to a voltmeter in a form substantially the same as that disclosed in the above mentioned co-pending application. It is to be distinctly understood, however, that the broader aspects of the invention are in no way limited to the instrument being a voltmeter or any other type or variety of electrical instrument.

I have illustrated in the drawings an instrument 10 in the form of a voltmeter. The voltmeter 10 includes a suitable frame 11, a suitably graduated scale 12, an indicating arm 13, adapted to cooperate with the scale, and operating means 14, for the arm. In this particular instrument the scale 12 is an arcuate scale located at the front of the instrument immediately behind a suitable transparent part 15. The scale 12 is supported from a suitable stationary part of the instrument by means of brackets 20. The arm 13 is mounted to move or swing in a horizontal plane, and is provided at its outer end with a head 16 adapted to cooperate with the scale. The operating means 14 for the arm is connected in a suitable circuit carried by a conductor 19. The means 14 is such as to be actuated by the current carried by the conductor 19, so that it operates the arm 13.

The instrument is further provided with adjustable means for limiting or stopping movement of the arm 13. The form of stop means illustrated includes a stop part 21 having one end connected to one of the brackets 20, and its other end in position to engage and stop the arm 13. The last mentioned end of the stop part 21 may be adjusted or varied as to position by a screw 23 carried by bracket 20.

The contact device provided by this invention includes, generally, a movable contact 25 and one or more stationary contacts 26. The movable contact 25 is operatively connected with the arm 13 of the instrument. In the preferred arrangement the contact 25 is carried directly by the arm 13, and is in the form of a bar or pin. The contact is carried by the arm in a vertical position and preferably so that it can be adjusted vertically. I have illustrated the contact 25 slidably carried in a boss 27, provided on the arm, and have shown a set screw 28 for setting the contact in the desired position in the boss.

In the form of the invention illustrated in the drawings there is a plurality of stationary contacts 26, arranged to be engaged by the lower end of the contact 25 upon the contact 25 being carried or moved by the arm 13. In accordance with this invention each contact 26 is formed by a body or globule of mercury carried in an indentation 29, in a suitable support 30. The support 30 is arranged horizontally, and the indentation 29 and globule of mercury are proportioned so that the mercury stands or projects somewhat above the support. The support is spaced below the lower end of the contact 25 so that the contact 25 will not engage the support 30 but will engage the mercury contacts. In a case where there are several contacts 26, there may be a single or common support 30 provided at the proper points or intervals with the indentations to carry the globules of mercury; the indentations being located so that the globules of mercury are in the path of the contact 25.

Walls 32 extend upwardly from or around the support 30 to form a container for oil, or the like. In the particular container illustrated in the drawings the walls extend upwardly from the support so that the support forms the bottom of the container. Oil or other suitable fluid is filled into the container to completely submerge the globules of mercury.

The support 30 and the parts which form the container for the oil may be supported in the proper position in any suitable manner. In the drawings this support 30 is provided with suitable supporting brackets 35 connected to a stationary part of the instrument by means of screws 36.

The necessary electrical connections may be made by or through the mechanism just described in various manners. In the arrangement illustrated in the drawings contacts 25 and 26 cooperate to control a relay R. The relay R is connected with one side of a battery B, or other suitable source of energy, by a conductor 40. The other side of the battery B is connected with the relay through a conductor 41, the contacts 25 and 26 and a conductor 42. The conductor 41 extends from the battery to the frame of the instrument which is grounded with the arm 13 of the instrument. The conductor 42 extends from one of the brackets 35 to the relay. The supporting brackets 35 for the support 30 are insulated from the instrument by means of insulation 44 arranged between the brackets 35 and the part of the instrument to which the brackets are connected. The relay R may be arranged and connected to control any desired circuit or apparatus, for instance, it may be arranged to control an alarm circuit as in the case set forth in the above mentioned co-pending application.

From the foregoing description, it is believed that the operation of the apparatus will be fully understood. When the instrument or voltmeter is actuated so that the arm 13 is moved the contact 25 is moved into and out of engagement or contact with the mercury contacts 26. The moving of the contact 25 into and out of engagement with the contact 26, makes and breaks the relay circuit. In the case of several contacts 26 such as I have illustrated in the drawings, the relay circuit will be made and broken several times during the movement of the arm 13, through its full travel. If it is desired to have the relay circuit held open or closed when the arm of the instrument is fully actuated the stop 21 may be adjusted to stop the arm 13 in the proper position with relation to one of the mercury contacts 26.

It will be apparent that the contact 25 will move over or through the mercury contacts 26 with a minimum amount of friction, and that the oil in which the contacts 26 are submerged will prevent or at least minimize arcing.

Having described only a typical form and application of my invention I do not wish to limit myself to the particular details herein above set forth, but wish to reserve to myself any changes or variations that may appear to those skilled in the art and fall within the scope of the following claim.

I claim:

In combination, an instrument having a horizontally movable indicating part, an open topped container arranged below the indicating part, the bottom of the container having a depression, a globule of mercury carried in the depression to project above the bottom of the container, fluid in the container covering the mercury, and a contact carried by the indicating part to extend into the container to clear the bottom of the container and cooperate with the mercury.

In witness that I claim the foregoing I have hereunto subscribed my name this 29th day of April, 1924.

WILLIAM R. FRAMPTON.